(12) United States Patent
Holmberg et al.

(10) Patent No.: US 10,997,313 B2
(45) Date of Patent: May 4, 2021

(54) TRACEABILITY IDENTIFIER

(71) Applicant: Hewlett-Packard Development Company, L.P., Spring, TX (US)

(72) Inventors: Mike Holmberg, Boise, ID (US); Nataraj Kumar Gobbak, Boise, ID (US); David Glen Larson, Boise, ID (US); Kim Hilliard, Boise, ID (US); Michael Salaz, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 150 days.

(21) Appl. No.: 16/346,391

(22) PCT Filed: Nov. 10, 2016

(86) PCT No.: PCT/US2016/061237
§ 371 (c)(1),
(2) Date: Apr. 30, 2019

(87) PCT Pub. No.: WO2018/089001
PCT Pub. Date: May 17, 2018

(65) Prior Publication Data
US 2019/0258821 A1    Aug. 22, 2019

(51) Int. Cl.
*G06F 21/62* (2013.01)
*G06Q 30/02* (2012.01)

(52) U.S. Cl.
CPC ..... *G06F 21/6245* (2013.01); *G06Q 30/0201* (2013.01)

(58) Field of Classification Search
None
See application file for complete search history.

(56) References Cited

U.S. PATENT DOCUMENTS

| 7,908,640 B2* | 3/2011 | Beresnevichiene ......... G06F 21/6281 726/1 |
| 8,069,450 B2* | 11/2011 | Beresnevichiene ..... G06F 9/468 719/313 |
| 8,522,196 B1* | 8/2013 | Kim ................... G06F 11/3664 717/105 |

(Continued)

FOREIGN PATENT DOCUMENTS

JP    1999-203183    7/1999

OTHER PUBLICATIONS

McClatchey, R. et al, Traceability and Provenance in Big Data Medical Systems, 2015 /https://arxiv.org/ftp/ ~ 6 pages.

(Continued)

*Primary Examiner* — Piotr Poltorak
(74) *Attorney, Agent, or Firm* — HP Inc. Patent Department

(57) ABSTRACT

Examples disclosed herein relate to a traceability identifier method comprising assigning a traceability identifier to a data element, wherein the traceability identifier comprises a plurality of identifier segments, receiving a request for the data element to be included in an analytics report, determining, according to the traceability identifier, whether the data element is permitted to be included in the analytics report, and in response to determining that the data element is permitted to be included in the analytics report, providing the data element for use in the analytics report.

19 Claims, 4 Drawing Sheets

(56) References Cited

U.S. PATENT DOCUMENTS

| | | | |
|---|---|---|---|
| 8,838,784 B1* | 9/2014 | Kalavade | H04L 67/22 |
| | | | 709/224 |
| 9,521,166 B2* | 12/2016 | Wilson | G06F 11/3688 |
| 2001/0013008 A1* | 8/2001 | Waclawski | G06F 11/3452 |
| | | | 702/186 |
| 2002/0022996 A1* | 2/2002 | Sanborn | G06Q 30/0241 |
| | | | 705/14.37 |
| 2004/0139147 A1 | 7/2004 | Duquenne et al. | |
| 2006/0238919 A1 | 10/2006 | Bradley | |
| 2007/0133044 A1* | 6/2007 | Tanaka | G06F 21/608 |
| | | | 358/1.15 |
| 2008/0224823 A1 | 9/2008 | Lawson et al. | |
| 2008/0307491 A1 | 12/2008 | Duri et al. | |
| 2010/0076777 A1* | 3/2010 | Paretti | G06Q 30/02 |
| | | | 705/1.1 |
| 2012/0150587 A1* | 6/2012 | Kruger | G06Q 30/0201 |
| | | | 705/7.34 |
| 2013/0041866 A1 | 2/2013 | Simske et al. | |
| 2013/0097091 A1 | 4/2013 | Biswas | |
| 2013/0185624 A1 | 7/2013 | Appleyard et al. | |
| 2014/0372427 A1 | 12/2014 | Lehmann et al. | |
| 2015/0127379 A1* | 5/2015 | Sorenson | G16H 10/20 |
| | | | 705/3 |
| 2015/0278027 A1* | 10/2015 | Nishi | H04L 67/42 |
| | | | 707/652 |
| 2015/0347542 A1 | 12/2015 | Sullivan et al. | |
| 2016/0104003 A1 | 4/2016 | Schneider et al. | |
| 2019/0075344 A1* | 3/2019 | Brown | H04N 21/25891 |
| 2019/0096020 A1* | 3/2019 | Barday | G06F 21/552 |
| 2019/0342088 A1* | 11/2019 | Eidson | H04L 9/14 |

OTHER PUBLICATIONS

Schmacher, A., et al, A Collaborative Approach to Develop a Multi-omics Data Analytics Platform for Translational Research, Sep. 16, 2014 ~ 4 pages http://www.ncbi.nlm.nih.gov/.

Vukatana, K. et al., Wine Traceability: a Data Model and Prototype in Albanian Context, Feb. 17, 2016,http://www.mdpi.com/ ~ 8 pages.

* cited by examiner

TRACEABILITY IDENTIFIER

BACKGROUND

In some situations, analytics reports such as sales figures, recurring subscriptions, usage tracking, and the like are generated. Such reports employ a set of rules to analyze various data elements, which may often be gathered from a number of disparate sources, such as different customers or geographic regions. Such data may be aggregated to allow the analytics reports to offer projections across different markets and/or to validate whether operations and/or trends are performing within such projections.

BRIEF DESCRIPTION OF THE DRAWINGS

In the accompanying drawings, like numerals refer to like components or blocks. The following detailed description references the drawings, wherein.

Figure 1:
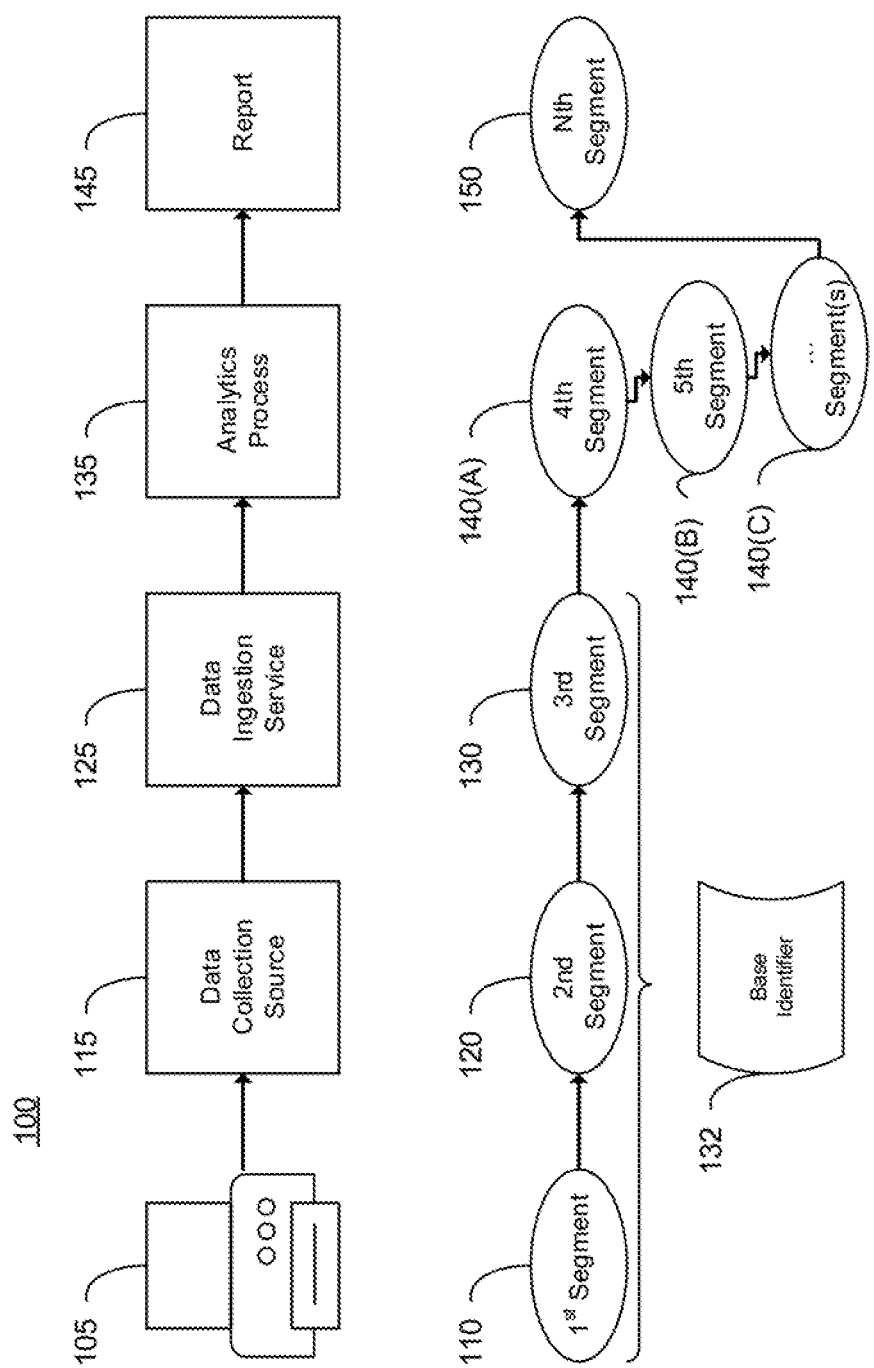
FIG. 1 is a block diagram of an example traceability identifier.

DETAILED DESCRIPTION in some situations, vast amounts of data may be collected from a multitude of sources. For example, an enterprise may own and operate a fleet of dozens or even hundreds of printers, copiers, computers, and other electronic devices across many different geographic locations. For another example, a company may sell a wide variety of products and devices to customers around the world. In these and other examples, the devices may collect operational data and provide it to a data collection and analytics server. Such data may comprise, for example, types, brands, and amounts of consumable supplies used, times and levels of use, locations, types of users, errors, service logs, etc.

These data elements may be collected and ingested into a data processing service where the data elements may be aggregated, enriched, and/or transformed based on various rules to generate analytics and business intelligence (BI) reports. Business analytics and BI reports may provide key insights and actions for the enterprise and/or business. However, this data is often anonymized during the ingestion and aggregation process to protect user privacy. This sometimes results in confusion and/or lack of detail about the source and permissible uses for the data elements.

In some implementations, each data element may be tracked from end-to-end (e.g., from origin through analysis reporting/use, and monetization) for every step/process that touches, transforms or transacts with the data elements. Such tracking allows for compliance with laws and regulations for information governance for data and facilitates the implementation of policies related to privacy and data sharing and transmission throughout the world. For example, some processes that interact with the data elements may need to comply with legal and/or company policies that affect which data may be used based on privacy and/or consent agreements signed by a customer. End-to-end tracking of the data elements may also assist in effective verification and/or troubleshooting of analytics results and processes.

In a use case consistent with some implementations, gathered data may be used to provide direct marketing offers from an equipment manufacturer and retail partner to end customers. Some customers may be located in a country, such as the United Kingdom, that has privacy regulations requiring that notices must be provided to the customers prior to providing any offers and/or direct marketing. User consent to receiving such offers may therefore need to be tracked to be sure any customer data used in the marketing program complies with this requirement. In addition, legal changes may occur that effect the ability to use the users data in such programs after the consent is received.

In this use case, the user may consent, such as via an acceptance of license terms or other explanation displayed on a user interface of the product, such as a printer. The acceptance of the terms may be considered the data element to be tracked, and may be assigned an initial unique identifier code that may be associated with the user and/or product. The identifier may additionally include information about the version of the terms that the user accepted and the date the acceptance was received. The product may then upload the identifier for acceptance data element to a data collection service and/or client, which may update the identifier with further information such as where, when and how the data was received, who within an organization made modifications, and/or the identity of the previous or current owner/curator of the data.

Further developing this use case, a business process may scan through multiple data elements for target customers for the marketing promotion looking for identifiers containing both the user's acceptance and the target geographic area. The business process may add its own identifier to the selected traceability identifier(s) to indicate those elements used by the process and/or any analysis steps performed. Once the data element is selected for the direct marketing program, the identifier may be updated once again with identifying details for that program, such as the dates and the name of the retail partner involved.

The identifier for the original data element—the user's acceptance of the agreement to receive marketing information, in this use case—thus expands to include identifiers for all the processes, transformations, and programs that used the data. In case of a need to audit the information, the proper segments of the identifiers can be easily searched to determine which data elements were used in a given program. Similarly, should the user alter their consent, such as by requesting to opt out of marketing, the original data element can be updated to reflect that state and exclude their information from being used in that way.

In some implementations, the traceability identifier may be used for example, to determine whether the data element can be shared internally or externally and/or for the purposes of audit and compliance control with privacy and legal regulations of handling data. The traceability identifiers for data policy capture data elements (i.e., consent and/or permission to use data) may be compared to actual data uses that show up in audits of which data elements have been used. A compliance audit may, for example, show a percentage of traceability identifiers associated with data elements that are in compliance with a given policy. Further, an automated warning report may be set up to ensure data element use is flagged or alerted if violations are tried and may list the affected traceability identifiers.

Referring now to the drawings, FIG. 1 is a block diagram of an example traceability identifier 100. Traceability identifier 100 may comprise a plurality of identifier segments, each associated with components, processes, steps, analyses, reports, users, etc. For example, a segment of traceability identifier 100 may be associated with a current owner of the data element associated with traceability identifier 100. Each segment may comprise, for example, a string and/or number that may be delimited and/or composed of segments of known lengths (e.g., 32 bits) to form the completed traceability identifier 100. In some implementations, segments may comprise different lengths and may be known to have a certain length in certain positions within traceability identifier 100. For example, a first segment may comprise 32 bits, a second segment may comprise 24 bits, etc.

For example, traceability identifier 100 may be created for association with a source device 105 corresponding to a $1^{st}$ identifier segment 110. Traceability identifier 100 may be expanded, such as by appending additional bits to the $1^{st}$ identifier segment 110. For example, a data collection source 115 may be associated with a $2^{nd}$ identifier segment 120. Data collection source 115 may comprise, for example, an application with which a user interacts and/or an automated process. Data collection source 115 may operate on source device 105 and/or another computing device such as a mobile device, tablet, laptop, and/or desktop computer. The data collection source 115 may, for example, collect information about source device 105 (e.g., serial number, firmware version, model, location, network connectivity, etc.) and/or a user(s) associated with source device 105 (e.g., name, location, owner status, usage profile, agreement/acceptance of terms, etc.). Data collection source 113 may provide the collected data and the traceability identifier 100 comprising $1^{st}$ identifier segment 110 and $2^{nd}$ identifier segment 120 to a data ingestion service 125, such as a server-side application operated by a manufacturer, retailer, service contractor, and/or other party. Data ingestion service 125 may be associated with a $3^{rd}$ identifier segment appended to traceability identifier 100 and may identify data associated with the version, operator, location, time, etc. of service 125. $1^{st}, 2^{nd}$, and $3^{rd}$ identifier segments 110, 120, 130 may comprise a base identifier 132 for the collected data and may serve to identify the source. In some implementations, the base identifier 132 may be copied for each process that uses the data element(s) associated with traceability identifier 100. In other implementations, traceability identifier 100 may be appended to by all processes that use the associated data element(s).

In some implementations, data collection source 115, data ingestion service 125, and/or analytics process 135 may provide instructions to device 105, such as to change behaviors, responses, and/or types and/or frequencies of data collected. Such instructions may also be associated with a segment of the traceability identifier.

Analytics process 135 may operate on the data element(s) associated with traceability identifier 100 and may append a $4^{th}, 5^{th}$, and/or more identifier segment(s) 140(A)-(C). Each segment may be associated with a different process and/or step in the process. For example, $4^{th}$ identifier segment 140(A) may be associated with a process to verify a user's consent to a privacy policy allowing the use of their purchase history while $5^{th}$ identifier segment 140(B) may be associated with generating a marketing email to that customer. In some implementations, the data element(s) associated with traceability identifier 100 may be used to generate a report 145, such as an aggregated sales reports for a geographic region. An Nth identifier segment 150 may be appended to traceability identifier 100 to identify which report(s) have made use of the associated data element(s).

Figure 2:
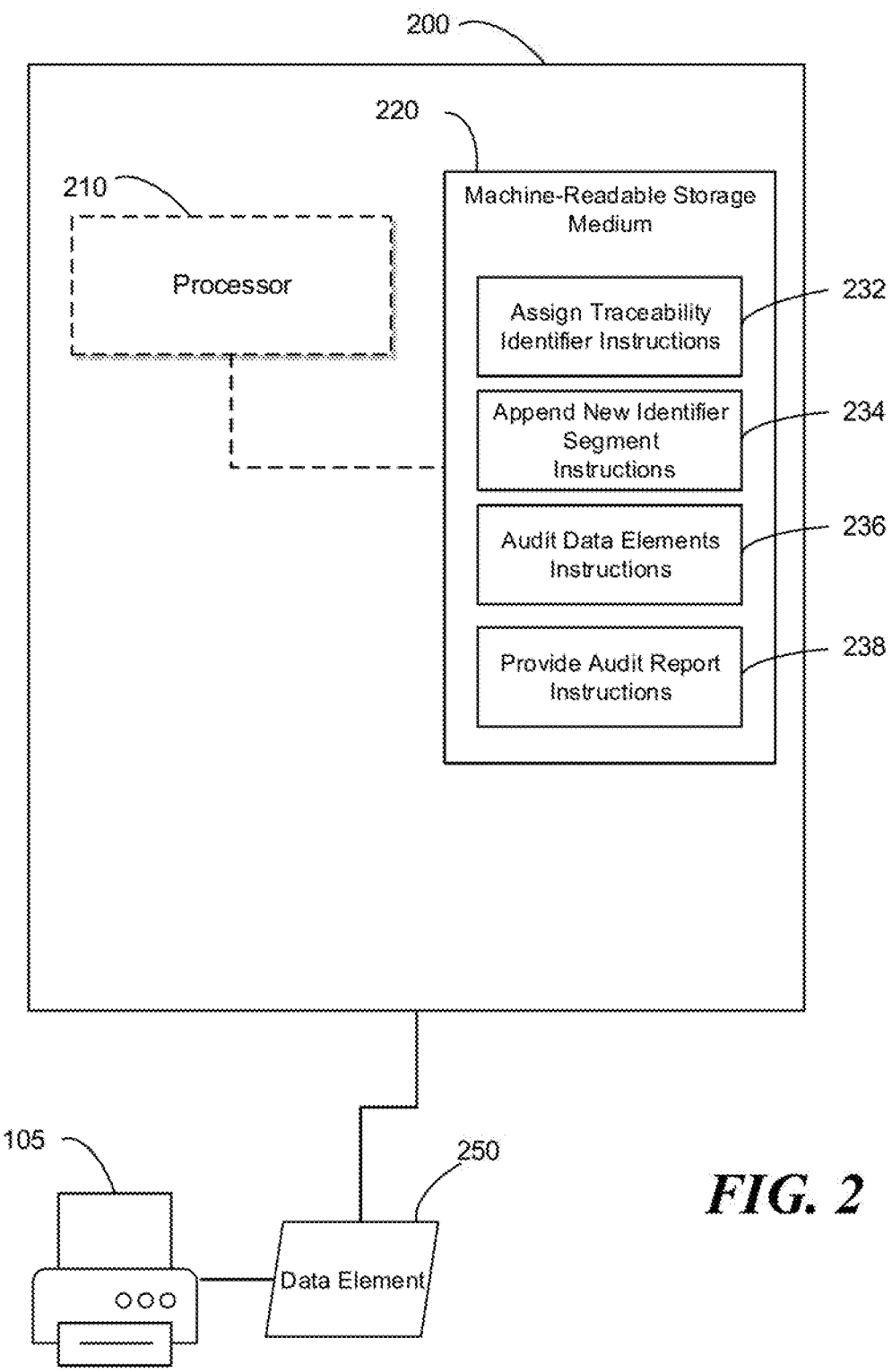
FIG. 2 is a block diagram of a traceability identifier device.

FIG. 2 is a block diagram of an example computing device 200 for providing a traceability identifier such as traceability identifier 100. Computing device 200 may comprise a processor 210 and a memory 215 comprising a non-transitory, machine-readable storage medium. Memory 215 may comprise a plurality of processor-executable instructions, such as assign traceability identifier instructions 232, append new identifier segment instructions 234, audit data elements instructions 236, and/or provide audit report instructions 238. In some implementations, instructions 232, 234, 236, 238 may be associated with a single computing device 200 and/or may be communicatively coupled among different computing devices such as via a direct connection, bus, or network.

Processor 210 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 220. In particular, processor 210 may fetch, decode, and execute instructions 232, 234, 236, 238.

Executable instructions 232, 234, 236, 238 may comprise logic stored in any portion and/or component of machine-readable storage medium 220 and executable by processor 210. The machine-readable storage medium 220 may comprise both volatile and/or nonvolatile memory and data storage components. Volatile components are those that do not retain data values upon loss of power. Nonvolatile components are those that retain data upon a loss of power.

The machine-readable storage medium 220 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Assign traceability identifier instructions 232 may assign a traceability identifier to a data element, wherein the traceability identifier comprises a plurality of identifier segments. For example, source device 105 may provide a data element 250 to computing device 200. Data element 250 may comprise, for example, warranty registration data such as purchase data and location, serial number, and/or an owner's user information. Data element 250 may be received by assign traceability identifier instructions 232 that may assign a first identifier segment to data element 250. The first segment may comprise, for example, a unique 32-bit numeric and/or alphanumeric sequence of bits and may comprise data validation information, such as a checksum associated with the data element. The uniqueness scope of the 32-bit segment may vary between implementations. For example, the segment may be unique across all of an enterprise's analytics processes and/or simply across a particular product line and/or geographic area. Additionally, 32-bits is used herein as an example, and other segment sizes or arrangements, such as a MAC, IPv6, and/or IPv4 address may be used for the first segment of the traceability identifier.

In some implementations, assign traceability identifier instructions 232 may append one and/or more other segments to the first segment, such as an identifier segment associated with the data gathering/collection process. For example, the additional segment(s) may identify computing device 200 as the data ingestion point and/or the time/date the data element was received. The additional segment(s) may be separated from the first segment by a delimiting character and/or may comprise known lengths to make it easy to separate each segment for processing and/or analysis.

Append new identifier segment instructions 234 may append a new identifier segment to the traceability identifier, wherein the new identifier segment is associated with a transformation of the data element. For example, a sales report may be executed to identify numbers and models of a product type sold within a region. Data elements associated with those product types may be collected and aggregated from a database and analyzed to produce this report. Each data element so analyzed may have a new identifier segment appended to the traceability identifier associated with the data element to indicate their use within the report. The new identifier segment may identify the analytics process and/or other information such as the date/time the report was run and/or the user who ran the report.

For another example, a marketing research report may select data elements associated with a particular type of product, such as source device 105, in order to identify targets for a marketing campaign. The data elements may comprise information regarding user consent to receive such marketing information, such as a time and/or date of agreement and/or a version of the agreement to which a user consented. The marketing research report may then be associated with a newly appended segment to the traceability identifier.

Audit data elements instructions 236 may audit a plurality of data elements according to the associated traceability identifier for each of the plurality of data elements. For example, with the marketing research example, an audit report may collect the traceability identifiers for all data elements included in the report and check the versions of the agreement to which the user consented. Data elements in which a user may not have consented to receiving marketing information may be flagged according to their traceability identifiers and listed in the audit report. For other examples, the audit report may simply provide a list of customers associated with a particular product line who have experienced errors, are approaching end of warranty, and/or are due for maintenance or supply replenishment.

Provide audit report instructions 238 may provide an audit report for the plurality of data elements. For example, a list of traceability identifiers, data elements, and/or underlying product/user information may be listed. In the example of an audit for data element usage that did not comply with a user's consent agreement to receive marketing information, the report may be used to tweak the marketing audit process to ensure that such violations do not occur again and/or for providing compliance information to regulators.

Figure 3:
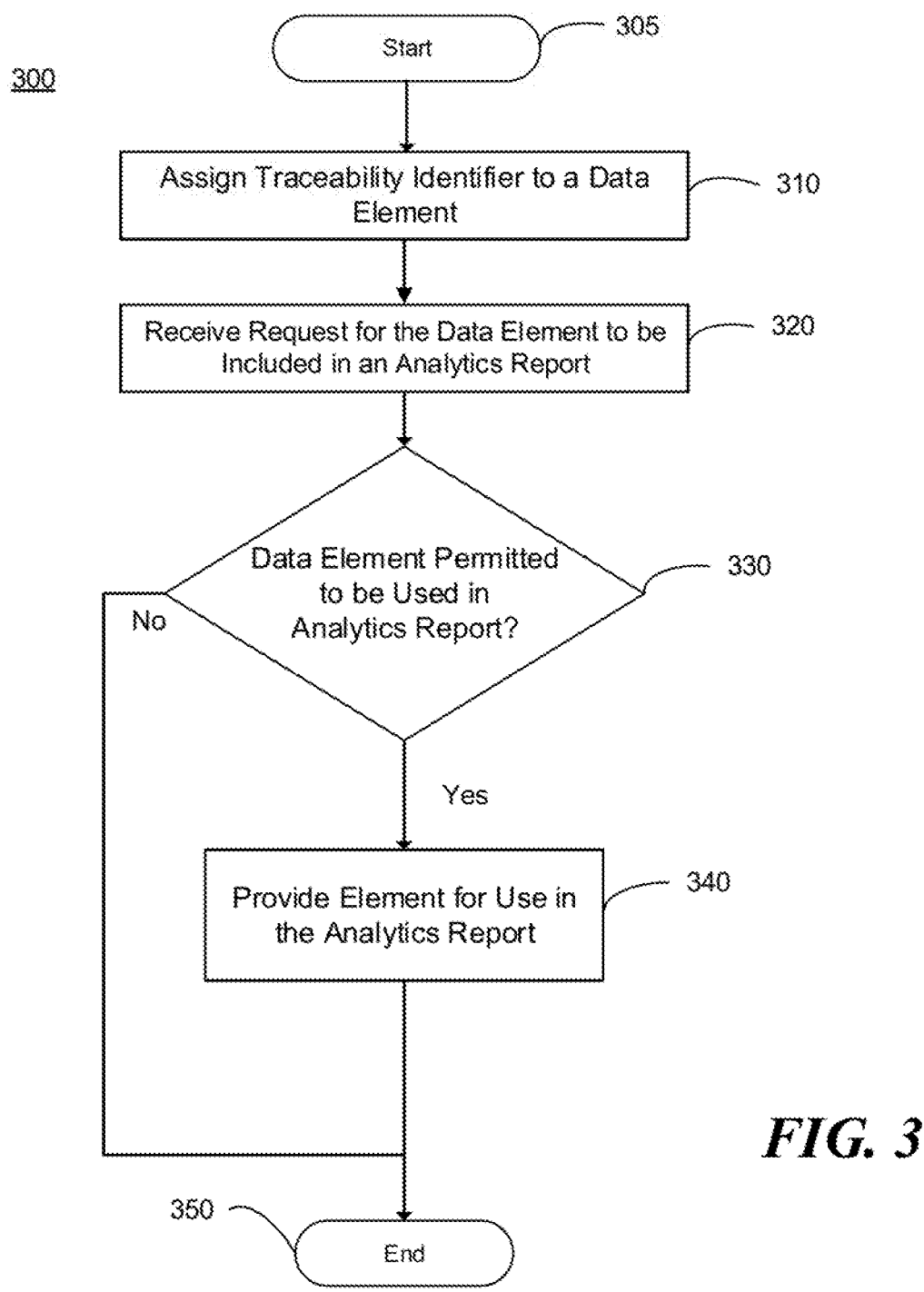
FIG. 3 is a flowchart of an example of a method for providing a traceability identifier.

FIG. 3 is a flowchart of an example method 200 for providing document element re-positioning consistent with disclosed implementations. Although execution of method 200 is described below with reference to computing device 200, other suitable components for execution of method 300 may be used.

Method 300 may begin in stage 305 and proceed to stage 310 where computing device 200 may assign a traceability identifier to a data element, wherein the traceability identifier comprises a plurality of identifier segments. For example, assign traceability identifier instructions 232 may assign a traceability identifier to a data element, wherein the traceability identifier comprises a plurality of identifier segments. For example, source device 105 may provide a data element 250 to computing device 200. Data element 250 may comprise, for example, warranty registration data such as purchase data and location, serial number, and/or an owner's user information. Data element 250 may be received by assign traceability identifier instructions 232 that may assign a first identifier segment to data element 250. The first segment may comprise, for example, a unique 32-bit numeric and/or alphanumeric sequence of bits and may comprise data validation information, such as a checksum associated with the data element. The uniqueness scope of the 32-bit segment may vary between implementations. For example, the segment may be unique across all of an enterprise's analytics processes and/or simply across a particular product line and/or geographic area. Additionally, 32-bits is used herein as an example, and other segment sizes or arrangements, such as a MAC, IPv6, and/or IPv4 address may be used for the first segment of the traceability identifier.

In some implementations, assign traceability identifier instructions 232 may append one and/or more other segments to the first segment, such as an identifier segment associated with the data gathering/collection process. For example, the additional segment(s) may identify computing device 200 as the data ingestion point and/or the time/date the data element was received. The additional segment(s) may be separated from the first segment by a delimiting character and/or may comprise known lengths to make it easy to separate each segment for processing and/or analysis. In some implementations, the identifier segments may comprise, for example, device identifier segments, user identifier segments, firmware version identifier segments, and/or data collection policy identifier segments.

Method 300 may then advance to stage 320 where computing device 200 may receive a request for the data element to be included in an analytics report. For example, a marketing research report may select data elements associated with a particular type of product, such as source device 105, in order to identify targets for a marketing campaign. The data elements may comprise information regarding user consent to receive such marketing information, such as a time and/or date of agreement and/or a version of the agreement to which a user consented. The marketing research report may then be associated with a newly appended segment to the traceability identifier.

Method 300 may then advance to stage 320 where computing device 200 may determine, according to the traceability identifier, whether the data element is permitted to be included in the analytics report. In some implementations, determining whether the data element is permitted to be included in the analytics report may comprise determining whether the analytics report complies with a requirement of a data collection policy associated with the data collection policy identifier.

In response to determining that the data element is permitted to be included in the analytics report, method 300 may advance to stage 340 where computing device 2100 may provide the data element for use in the analytics report. Such a report identifier associated with the analytics report may comprise a report version identifier (e.g., a code release version associated with a software application/process to produce the report.) The analytics report may comprise, for example, a plurality of data elements associated with a plurality of data collection policies. For example, audit data elements instructions 236 may audit a plurality of data elements according to the associated traceability identifier for each of the plurality of data elements. For example, with the marketing research example, an audit report may collect the traceability identifiers for all data elements included in the report and check the versions of the agreement to which the user consented. Data elements in which a user may not have consented to receiving marketing information may be flagged according to their traceability identifiers and listed in e audit report. For other examples, the audit report may simply provide a list customers associated with a particular product line who have experienced errors, are approaching end of warranty, and/or are due for maintenance or supply replenishment.

In some implementations, providing the data element for use in the analytics report may comprise creating a copy of the data element and associating the traceability identifier to the copy of the data element. For example, each analytics process 135 utilizing the data element may receive a copy of base identifier 132 rather than all of the analytics processes appending to the same traceability identifier. For example, provide audit report instructions 238 may provide an audit report for the plurality of data elements. For example, a list of traceability identifiers, data elements, and/or underlying product/user information may be listed. In the example of an audit for data element usage that did not comply with a user's consent agreement to receive marketing information, the report may be used to tweak the marketing audit process to ensure that such violations do not occur again and/or for providing compliance information to regulators.

In some implementations, computing device 200 may, in response to determining that the data element is permitted to be included in the analytics update the traceability identifier with a new identifier segment, wherein the new identifier segment comprises a report identifier associated with the analytics report. In some implementations, the report identifier associated with the analytics report may comprise at least one processing step identifier and at least one processing step result identifier. For example, an identifier associated with an analysis step of determining whether consent to receive marketing information was agreed to by a consumer may be associated with one identifier segment while a result (e.g., yes or no) may be associated with another identifier segment. In some implementations, the same identifier segment may be used to indicate both the processing step and the result (e.g., the first 16 bits of a 32-bit identifier may be associated with the step and the second 32 bits may be associated with the result).

Method 300 may then end at stage 350.

Figure 4:
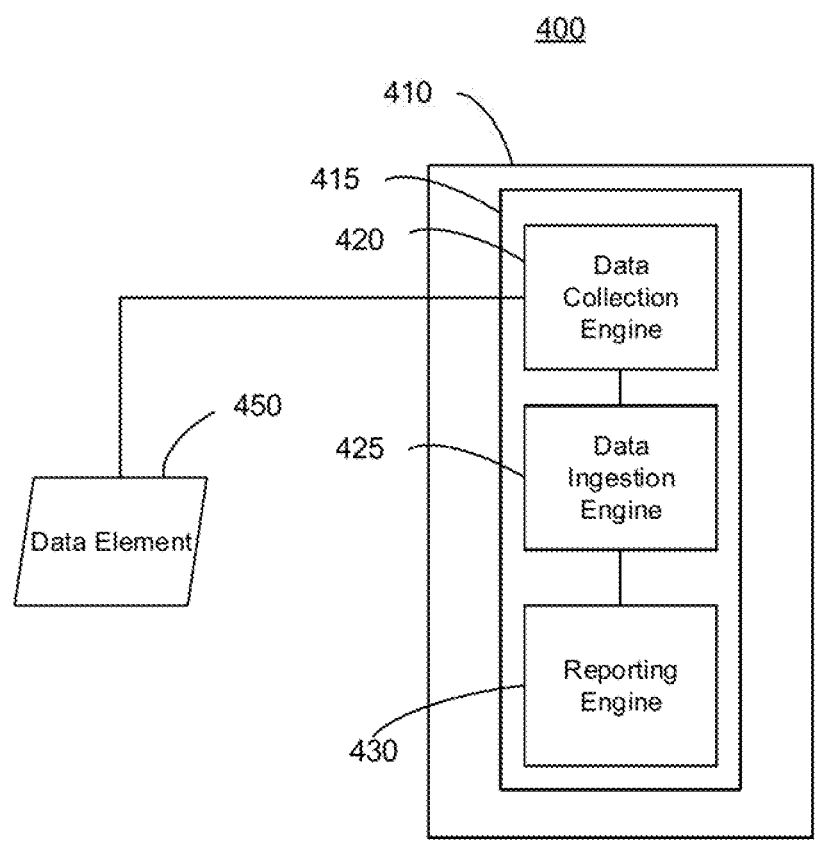
FIG. 4 is a block diagram of an example system for providing a traceability identifier.

FIG. 4 is a block diagram of an example system 400 for providing a traceability identifier. System 400 may comprise a computing device 410 comprising a memory 415. Computing device 410 may comprise, for example, a general and/or special purpose computer, server, mainframe, desktop, laptop, tablet, smart phone, game console, printer and/or any other system capable of providing computing capability consistent with providing the implementations described herein. Computing device 410 may store, in memory 415, a data collection engine 420, a data ingestion engine 425, and a reporting engine 430.

Data collection engine 420 may collect a data element from at least one of a device and a user and assign a traceability identifier to the data element. For example, assign traceability identifier instructions 232 may assign a traceability identifier to a data element, wherein the traceability identifier comprises a plurality of identifier segments.

For example, source device 105 may provide a data element 250 to computing device 200. Data element 250 may comprise, for example, warranty registration data such as purchase data and location, serial number, and/or an owner's user information. Data element 250 may be received by assign traceability identifier instructions 232 that may assign a first identifier segment to data element 250. The first segment may comprise, for example, a unique 32-bit numeric and/or alphanumeric sequence of bits and may comprise data validation information, such as a checksum associated with the data element. The uniqueness scope of the 32-bit segment may vary between implementations. For example, the segment may be unique across all of an enterprise's analytics processes and/or simply across a particular product line and/or geographic area. Additionally, 32-bits is used herein as an example, and other segment sizes or arrangements, such as a MAC, IPv6, and/or IPv4 address may be used for the first segment of the traceability identifier.

In some implementations, assign traceability identifier instructions 232 may append one and/or more other segments to the first segment, such as an identifier segment associated with the data gathering/collection process. For example, the additional segment(s) may identify computing device 200 as the data ingestion point and/or the time/date the data element was received. The additional segment(s) may be separated from the first segment by a delimiting character and/or may comprise known lengths to make it easy to separate each segment for processing and/or analysis.

Data ingestion engine 425 may receive the data element from the at least one of the device and the user and append an identifier segment associated with the data ingestion engine to the traceability identifier. For example, source device 105 may upload a data element 450 to computing device 410. Data collection engine 420 may assign first identifier segment 110 and or second identifier segment 120 to a traceability identifier for data element 450, then pass data element 450 and the traceability identifier to data ingestion engine 425. Data ingestion engine 425 may assign $3^{rd}$ identifier segment 130 to the traceability identifier, which may identify, for example, details about when, where, and/or how data element 450 was received. Data ingestion engine 425 may be further responsible for formatting and/or storing data element 450 in a database for future use.

Reporting engine 430 may receive a request for the data element to be included in an analytics report, determine, according to the traceability identifier, whether the data element is permitted to be included in the analytics report, and in response to determining that the data element is permitted to be included in the analytics report, provide the data element for use in the analytics report. For example, audit data elements instructions 236 may audit a plurality of data elements according to the associated traceability identifier for each of the plurality of data elements. For example, with the marketing research example, an audit report may collect the traceability identifiers for all data elements included in the report and check the versions of the agreement to which the user consented. Data elements in which a user may not have consented to receiving marketing information may be flagged according to their traceability identifiers and listed in the audit report. For other examples, the audit report may simply provide a list of customers associated with a particular product line who have experienced errors, are approaching end of warranty, and/or are due for maintenance or supply replenishment.

Provide audit report instructions 238 may provide an audit report for the plurality of data elements. For example, a list of traceability identifiers, data elements, and/or underlying product/user information may be listed. In the example of an audit for data element usage that did not comply with a user's consent agreement to receive marketing information, the report may be used to tweak the marketing audit process to ensure that such violations do not occur again and/or for providing compliance information to regulators.

Although one computing device 410 is depicted in FIG. 4, certain implementations of system 400 may comprise more than one computing device 410. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:

1. A method comprising:
   assigning a traceability identifier to a data element, wherein the traceability identifier comprises a plurality of identifier segments, including a data collection policy identifier;
   receiving a request for the data element to be included in an analytics report;
   determining, according to the traceability identifier, whether the data element is permitted to be included in the analytics report, including determining whether the analytics report complies with a requirement of a data collection policy associated with the data collection policy identifier;
   in response to determining that the data element is permitted to be included in the analytics report, providing the data element for use in the analytics report, and updating the traceability identifier with a new identifier segment, wherein the new identifier segment comprises a report identifier associated with the analytics report;
   generating the analytics report including the provided data element; and
   performing an action using the generated analytics report.

2. The method of claim 1, wherein the identifier segments include a source device identifier segment.

3. The method of claim 2, wherein the source device identifier segment comprises a firmware version identifier.

4. The method of claim 1, wherein the identifier segments include a user identifier.

5. The method of claim 1, further comprising:
   performing a transformation step on the data element; and
   updating the traceability identifier with a second new identifier segment wherein the second new identifier segment comprises a processing identifier associated with a data processing step.

6. The method of claim 1, wherein the report identifier associated with the analytics report comprises a processing step identifier and at least one processing step result identifier.

7. The method of claim 1, wherein the plurality of identifier segments each comprise a data validation element.

8. The method of claim 1, wherein providing the data element for use in the analytics report comprises:
   creating a copy of the data element; and
   associating the traceability identifier to the copy of the data element.

9. The method of claim 1, wherein the analytics report comprises a plurality of data elements associated with a plurality of data collection policies.

10. The method of claim 1, wherein assigning a traceability identifier to a data element comprises recording the traceability identifier in a central ledger of a transaction record and/or recording the traceability identifier within the data element.

11. The method of claim 1, wherein performing the action using the generated analytics report comprises:
   sharing the provided data element internally or externally.

12. The method of claim 1, wherein performing the action using the generated analytics report comprises:
   transmitting the provided data element.

13. The method of claim 1, wherein performing the action using the generated analytics report comprises:
   auditing the provided data element for compliance with data handling regulations.

14. The method of claim 13, wherein performing the action using the generated analytics report further comprises:
   generating an alert responsive to the provided data element not complying with the data handling regulations.

15. The method of claim 1, wherein performing the action using the generated analytics report comprises:
   performing troubleshooting based on the generated analytics report.

16. The method of claim 1, wherein performing the action using the generated analytics report comprises:
   validating the provided data element.

17. The method of claim 1, wherein performing the action using the generated analytics report comprises:
   sending a communication to a user associated with the provided data element.

18. A non-transitory machine readable medium storing instructions executable by a processor to:

assign a traceability identifier to a data element, wherein the traceability identifier comprises a plurality of identifier segments, including a data collection policy identifier;

receive a request for the data element to be included in an analytics report;

determine, according to the traceability identifier, whether the data element is permitted to be included in the analytics report, including determining whether the analytics report complies with a requirement of a data collection policy associated with the data collection policy identifier;

in response to determining that the data element is permitted to be included in the analytics report, provide the data element for use in the analytics report, and update the traceability identifier with a new identifier seqment, wherein the new identifier segment comprises a report identifier associated with the analytics report;

generate the analytics report including the provided data element; and perform an action using the generated analytics report.

19. A system comprising:

a processor; and a memory storing instructions executable by the processor to:

assign a traceability identifier to a data element, wherein the traceability identifier comprises a plurality of identifier segments, including a data collection policy identifier;

receive a request for the data element to be included in an analytics report;

determine, according to the traceability identifier, whether the data element is permitted to be included in the analytics report, including determining whether the analytics report complies with a requirement of a data collection policy associated with the data collection policy identifier;

in response to determining that the data element is permitted to be included in the analytics report, provide the data element for use in the analytics report, and update the traceability identifier with a new identifier segment, wherein the new identifier segment comprises a report identifier associated with the analytics report;

generate the analytics report including the provided data element; and perform an action using the generated analytics report.

* * * * *